United States Patent [19]

Yamamoto et al.

[11] Patent Number: 5,627,440
[45] Date of Patent: May 6, 1997

[54] METHOD OF COMPUTING DRIVE PATTERN FOR SUPPRESSING VIBRATION OF INDUSTRIAL ROBOT

[75] Inventors: Tsuyoshi Yamamoto; Katsuhisa Tanaka, both of Toyota; Fumihiko Komuro, Aichi-ken, all of Japan

[73] Assignee: Toyota Jidosha Kabushiki Kaisha, Toyota, Japan

[21] Appl. No.: 423,458

[22] Filed: Apr. 19, 1995

[30] Foreign Application Priority Data

Jun. 3, 1994 [JP] Japan ..................... 6-122843

[51] Int. Cl.$^6$ ................ G05B 5/01; B25J 9/18
[52] U.S. Cl. ................ 318/568.21; 318/568.22; 318/568.24; 318/611
[58] Field of Search ........................ 318/448, 460, 318/568.11, 568.2, 568.21, 568.22, 611, 434, 563, 565, 568.16, 568.24, 623, 629, 632; 901/9, 19, 23; 364/174

[56] References Cited

U.S. PATENT DOCUMENTS

| 3,921,818 | 11/1975 | Yamagishi . |
| 4,555,758 | 11/1985 | Inaba et al. . |
| 5,049,797 | 9/1991 | Phillips . |
| 5,102,289 | 4/1992 | Yokoshima et al. . |

FOREIGN PATENT DOCUMENTS

| 0163090 | 12/1985 | European Pat. Off. . |
| 1172413 | 6/1964 | Germany . |
| 59-003506 | 1/1984 | Japan . |
| 59-002108 | 1/1984 | Japan . |
| 61-088306 | 5/1986 | Japan . |
| 63-308603 | 12/1988 | Japan . |
| 63-314607 | 12/1988 | Japan . |
| 63-314606 | 12/1988 | Japan . |
| 6-114762 | 4/1994 | Japan . |
| 6-114761 | 4/1994 | Japan . |
| 2018466 | 10/1979 | United Kingdom . |

OTHER PUBLICATIONS

*Journal of Science and Precision Engineering*, "Output of Cam Motion Curve by DC Servo Motor (2nd Report): Resisual Vibrating Characteristics of Motor Load." Kazuo Kanzaki et al., Nov. 1991, pp. 133–139. Japan.

*Journal of Science and Precision Engineering*, "Output of Cam Motion Curve by DC Servo Motor (3rd Report): Positioning by Polydyne Motion Curve." Kazuo Kanzaki et al., Jan. 1993: pp. 107–112. Japan.

*Primary Examiner*—Bentsu Ro
*Attorney, Agent, or Firm*—Oliff & Berridge

[57] ABSTRACT

Vibration occurring at an arm part of an industrial robot when the arm part is moved is controlled by combining vibrations occurring at two time points for mutual interference. In each of acceleration and slowdown periods, the time difference of rise and fall time points $t_1$, $t_4$ and $t_2$, $t_3$ of a differential value of an acceleration with respect to time is set to be an integral number times the natural vibration period of the system so that the vibrations occurring at the rise and fall time points interfere with each other to cancel one another. Also, the vibration occurring in the acceleration period and the vibration occurring in the slowdown period can cancel each other.

17 Claims, 12 Drawing Sheets

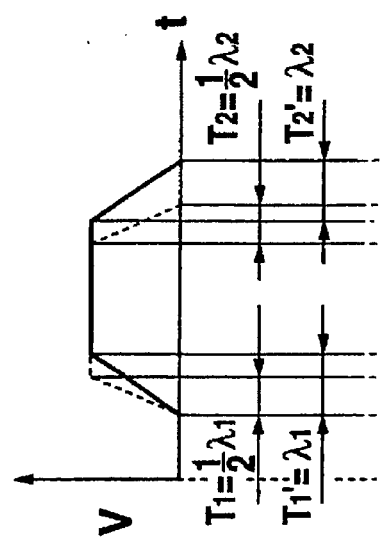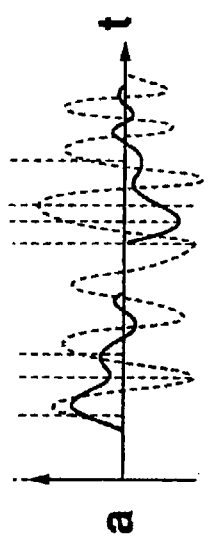
Fig. 12a　Fig. 13a
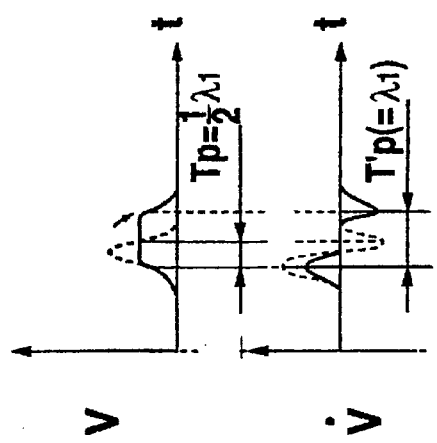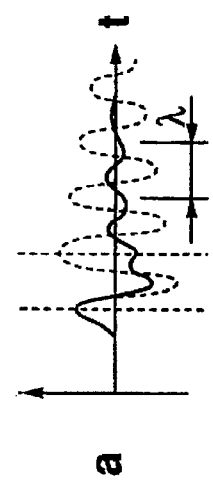
Fig. 12b
Fig. 12c　Fig. 13b

METHOD OF COMPUTING DRIVE PATTERN FOR SUPPRESSING VIBRATION OF INDUSTRIAL ROBOT

BACKGROUND OF THE INVENTION

1. Field of the Invention

This invention relates to a method for suppressing vibration of an object driven by a driving force, and more particularly to a method of controlling an industrial robot by suppressing vibration while a robot arm is running and when the robot arm is positioned in a stop position.

2. Description of the Prior Art

In recent years, in order to reduce the work load on workers in modern manufacturing plants, application of industrial robots has been on the increase. FIG. 1 of the accompanying drawings shows a conventional industrial robot of a biaxial control type in which the robot can rotate and can move vertically. As shown in FIG. 1, a finger portion 5 for gripping a workpiece is mounted on the distal end of a robot arm 4, which is driven by a servo motor 3 for rotational motion and a raising and lowering motion. The servo motor 3 is driven from a controller 1 via a servo amplifier 2.

If the above-mentioned robot is accelerated at a point a in FIG. 1 from a rest state to a predetermined speed and is then slowed down to assume a rest state at a point b, vibration would occur, particularly at points where acceleration varies largely, which might cause an error in controlling the robot so that it is necessary to wait for the next action until the vibration comes to an end. On many occasions, the points where this vibration occurs is start and end points of each of acceleration and slowdown. The vibration occurring during accelerating remains at the time of constant speed motion, which might cause an error in positioning the finger portion 5. The vibration at the time of constant speed motion would be a cause for nonuniform coating in, for example, coating work. In the presence of the vibration occurring during slowdown, after coming to rest, the robot has to wait for work such as assembling work, until the vibration comes to an end, thus resulting in a waste of time.

Studies have been made to suppress vibration of the robot; to this end, it is currently known to control vibration as disclosed in, for example, Japanese Patent Laid-Open Publications Nos. SHO 63-314606 and 63-314607. According to this apparatus, the vibration occurring at the distal end of a robot arm is detected by an acceleration sensor mounted on the robot arm end and this detection signal is back as a turbulent torque, thus adjusting the driving force to the occurred vibration.

In this prior art, however, damping control takes place after vibration has actually occurred so that, although the time from the occurrence of vibration to the end can be reduced, vibration cannot be eliminated. In other words, since control information to bring vibration to an end is obtained from the status of actual vibration, damping control cannot be performed until after vibration has occurred. It is therefore theoretically impossible to perfectly control vibration. Further, since vibration is damped following vibration of a relatively short period, this prior art control system requires a central processing unit (CPU) which enables high-speed computing. Accordingly the resultant control system is expensive and complicated.

SUMMARY OF THE INVENTION

In view of the foregoing problems, it is an object of this invention to suppress vibration of a moving part, such as an arm, of an industrial robot without counting on feedback control.

A specific object of the invention is to provide a method of and apparatus for computing a drive pattern which can suppress vibration of a moving part, such as an arm, of an industrial robot and can give a damping effect. Another specific object of the invention is to provide a method of controlling an industrial robot according to the computed drive pattern.

According to a first aspect of the invention, there is provided a method of computing a drive pattern for suppressing vibration of a moving part, comprising the steps of: (a) obtaining a driving pattern of the moving part, which pattern includes an acceleration period, a constant speed period and a slowdown period; (b) calculating a differential value of acceleration with respect to time of the moving part, from the drive pattern; (c) calculating a time difference between a rise portion and a fall portion of the differential value of the acceleration time; and (d) correcting the drive pattern in such a manner that the time difference changes substantially by an integral number times a natural vibration period of the moving part.

The drive pattern correcting step may comprise fixing the duration of the acceleration and/or slowdown period, setting, in the fixed duration of the acceleration and/or slowdown period, an acceleration constant increase period in which acceleration increases at a constant rate with respect to time and an acceleration constant decrease period in which acceleration decreases at a constant rate with respect to time, and correcting the duration of each of the acceleration constant increase period and acceleration constant decrease period.

The drive pattern correcting step may be the step of correcting the duration of the acceleration or slowdown period, so as to be equal to the natural vibration period of the moving part, under the condition that acceleration is constant in the acceleration or slowdown period.

With these drive patterns, the moving part of the industrial robot is caused to start vibrating at its natural frequency at rise and fall portions of the differential value of acceleration with respect to time of the moving part. At the rise and fall portions, since the directions of applying the respective vibrations are opposite to each other, the vibration occurring at the rise portion is canceled by the vibration occurring at the fall portion.

Further, if the acceleration and slowdown periods include an acceleration constant increase period in which acceleration increases at a constant rate, an acceleration constant decrease period in which acceleration decreases at a constant rate and a constant acceleration period in which acceleration is constant, the start point of each of the acceleration constant increase period and the acceleration constant decrease period is the time point in which vibration is exerted on the moving part, thus facilitating calculation of the vibration applying time difference.

Furthermore, without changing the duration of the acceleration and slowdown periods, it is possible to correct the vibration applying time difference by changing the duration of the acceleration constant decrease period and/or the acceleration constant increase period. It is therefore possible to suppress vibration without extending the acceleration period and/or slowdown period so that the work time is not long.

According to a second aspect of the invention, there is provided a method of computing a drive pattern for suppressing vibration of a moving part, comprising the steps of: (a) obtaining a driving pattern of the moving part, which pattern includes an acceleration period, a constant speed period and a slowdown period; and (b) judging, by comparing the duration of each of the acceleration period and slowdown period of the drive pattern with the natural vibration period of the moving part, as to whether the duration of each of the acceleration period and slowdown period of the drive pattern is longer or shorter than the natural vibration period; (c) the method, if the acceleration or slowdown period is longer than the natural vibration period, further including: (1) calculating a differential value of acceleration with respect to time of the moving part, from the drive pattern; (2) calculating a time difference between a rise portion and a fall portion of the differential value of the acceleration time; and (3) correcting the drive pattern, in such a manner that the time difference changes substantially by an integral number times a natural vibration period of the moving part, by fixing the duration of the acceleration and/or slowdown period, setting, in the fixed duration of the acceleration and/or slowdown period, an acceleration constant increase period in which acceleration increases at a constant rate with respect to time and an acceleration constant decrease period in which acceleration decreases at a constant rate with respect to time, and correcting the duration of each of the acceleration constant increase period and acceleration constant decrease period; (d) the method, if the acceleration or slowdown period is shorter than the natural vibration period, further including the step of (4) correcting the duration of the acceleration or slowdown period, so as to be equal to the natural vibration period of the moving part, under the condition that acceleration is constant in the acceleration or slowdown period.

Using this drive pattern computing method, it is possible to suppress vibration by two vibrations occurring with a time lag, even if the duration of the acceleration or slowdown period is shorter than the natural vibration period of the moving part.

According to a third aspect of the invention, there is provided a method of computing a drive pattern for suppressing vibration of a moving part of an industrial robot, comprising the steps of: (a) obtaining a drive pattern of the moving part; (b) calculating a time difference of torque peaks in the acceleration and slowdown periods of the drive pattern; and (c) correcting the drive pattern in such a manner that the time difference changes substantially by an integral number times the natural vibration period of the moving part.

With this drive pattern, since the vibrations causing forces develop near the torque peak of the acceleration period, and the slowdown periods interfere with each other, it is possible to prevent the moving part of the robot from vibrating in a rest position.

According to a fourth aspect of the invention, there is provided a method of computing a drive pattern for suppressing vibration of a moving part of an industrial robot, comprising: (a) obtaining a drive pattern of the moving part; (b) calculating a time difference of torque peaks in the acceleration and slowdown periods of the drive pattern; and (c) judging, by comparing the time difference with the natural vibration period of the moving part, as to whether the time difference is longer or shorter than the natural vibration period; (d) the method, if the time difference is shorter than the natural vibration period, further including: (1) correcting the drive pattern in such a manner that the time difference of the torque peaks substantially coincides with the natural vibration period; (e) the method, if the time difference is longer than the natural vibration period, further including the steps of: (2) calculating a time duration of each of the acceleration and slowdown periods of the drive pattern; and (3) judging, by comparing the duration of each of the acceleration and slowdown periods of the drive pattern with the natural vibration period, as to whether the duration of the acceleration and slowdown periods is longer or shorter than the natural vibration period; (f) the method, if the duration of the acceleration or slowdown period is longer than the natural vibration period, further including the steps of: (4) calculating a differential value of acceleration with respect to time of the moving part from the drive pattern; (5) calculating a time difference of rise and fall portions of the differential value of acceleration with respect to time; and (6) correcting the drive pattern, in such a manner that the time difference changes by an integral number times the natural vibration period, by fixing the duration of the acceleration or slowdown period and setting an acceleration constant increase period in which acceleration increases with time at a constant rate in the last-named period and an acceleration constant decrease period, in which acceleration decreases with time at a constant rate; (g) the method, if the acceleration or slowdown period is shorter than the natural vibration period, further including the step of (7) correcting the drive pattern, in such a manner that the duration of the acceleration or slowdown period coincides with the natural vibration period, under the condition that acceleration is constant in the acceleration or slowdown period.

By this drive pattern computing method, it is possible to suppress vibration of a moving part, irrespective of whether the time difference of torque peaks of each of the acceleration and slowdown periods is longer or shorter than the natural vibration period of the moving part. It is also possible to suppress vibration of a moving part. Irrespective of whether the acceleration or slowdown period is longer or shorter than the natural vibration period.

According to a fifth aspect of the invention, there is provided a method of controlling a moving part of an industrial robot, wherein the moving part is driven and controlled in a predetermined drive pattern in which a time difference of rise and fall portions of a differential value of acceleration with respect to time of the moving part is substantially an integral number times a natural vibration period of the moving part.

Further, the drive pattern may include an acceleration period in which the moving part is to be accelerated and a slowdown period in which the moving part is to be slowed down, and the acceleration and slowdown periods may include an acceleration constant increase period in which acceleration increases with time at a constant rate in the last-named periods and an acceleration constant decrease period in which acceleration decreases with time at a constant rate.

According to a sixth aspect of the invention, there is provided a method of controlling a moving part of an industrial robot, wherein the moving part is driven and controlled in a predetermined drive pattern in which a time difference of torque peaks in accelerating and slowing down the moving part is substantially an integral number times a natural vibration period of the moving part.

By each of these industrial robot control methods, it is possible to suppress occurrence of vibration as two vibrations occurring with a time difference between them are canceled by each other.

According to a seventh aspect of the invention, there is provided an apparatus for computing a drive pattern for suppressing vibration of a moving part of an industrial robot, comprising: (a) means for obtaining a drive pattern of the moving pattern, which pattern includes an acceleration period, a constant speed period and a slowdown period; (b)

means for calculating a differential value of acceleration with respect to time of the moving part from the drive pattern; (c) means for calculating a time difference of rise and fall portions of the acceleration time differential value; and (d) means for correcting the drive pattern in such a manner that the time difference is substantially an integral number times a natural vibration period of the moving part.

Further, the drive pattern correcting means comprises means for fixing the duration of the acceleration and/or slowdown period, means for setting, in the fixed duration of the acceleration and/or slowdown period, an acceleration constant increase period in which acceleration increases at a constant rate with respect to time and an acceleration constant decrease period in which acceleration decreases at a constant rate with respect to time, and means for correcting the duration of each of the acceleration constant change period and the acceleration constant decrease period.

According to an eighth aspect of the invention, there is provided an apparatus for computing a drive pattern for suppressing vibration of a moving part, comprising: (a) means for obtaining a driving pattern of the moving part which pattern includes an acceleration period, a constant speed period and a slowdown period; and (b) means for judging, by comparing the duration of each of the acceleration period and slowdown period of the drive pattern with the natural vibration period of the moving part, as to whether the duration of each of the acceleration period and slowdown period of the drive pattern is longer or shorter than the natural vibration period; (c) the apparatus, if the acceleration or slowdown period is longer than the natural vibration period, further including: (1) means for calculating a differential value of acceleration with respect to time of the moving part from the drive pattern; (2) means for calculating a time difference between a rise portion and a fall portion of the differential value of the acceleration time; and (3) means for correcting the drive pattern, in such a manner that the time difference changes substantially by an integral number times a natural vibration period of the moving part, by fixing the duration of the acceleration and/or slowdown period, setting, in the fixed duration of the acceleration and/or slowdown period, an acceleration constant increase period in which acceleration increases at a constant rate with respect to time and an acceleration constant decrease period in which acceleration decreases at a constant rate with respect to time, and correcting the duration of each of the acceleration constant increase period and acceleration constant decrease period; (d) the apparatus, if the acceleration or slowdown period is shorter than the natural vibration period, further including (4) means for correcting the duration of the acceleration or slowdown period, so as to be equal to the natural vibration period of the moving part, under the condition that acceleration is constant in the acceleration or slowdown period.

According to a ninth aspect of the invention, there is provided an apparatus for computing a drive pattern for suppressing vibration of a moving part of an industrial robot, comprising: (a) means for obtaining a drive pattern of the moving part; (b) means for calculating a time difference of torque peaks in the acceleration and slowdown periods of the drive pattern; and (c) means for correcting the drive pattern in such a manner that the time difference changes substantially by an integral number times the natural vibration period of the moving part.

According to a tenth aspect of the invention, there is provided an apparatus for computing a drive pattern for suppressing vibration of a moving part of an industrial robot, comprising: (a) means for obtaining a drive pattern of the moving part; (b) means for calculating a time difference of torque peaks in the acceleration and slowdown periods of the drive pattern; and (c) means for judging, by comparing the time difference with the natural vibration period of the moving part, as to whether the time difference is longer or shorter than the natural vibration period; (d) the apparatus, if the time difference is shorter than the natural vibration period, further including: (1) means for correcting the drive pattern in such a manner that the time difference of the torque peaks substantially coincides with the natural vibration period; (e) the apparatus, if the time difference is longer than the natural vibration period, further including: (2) means for calculating a time duration of each of the acceleration and slowdown periods of the drive pattern; and (3) means for judging, by comparing the duration of each of the acceleration and slowdown periods of the drive pattern with the natural vibration period, as to whether the duration of the acceleration and slowdown periods is longer or shorter than the natural vibration period; (f) the apparatus, if the duration of the acceleration or slowdown period is longer than the natural vibration period, further including: (4) means for calculating a differential value of acceleration with respect to time of the moving part from the drive pattern; (5) means for calculating a time difference of rise and fall portions of the acceleration time differential value; and (6) means for correcting the drive pattern, in such a manner that the time difference changes by an integral number times the natural vibration period, by fixing the duration of the acceleration or slowdown period and setting an acceleration constant increase period in which acceleration increases with time at a constant rate in the last-named period and an acceleration constant decrease time in which acceleration decreases with time at a constant rate; (g) the apparatus, if the acceleration or slowdown period is shorter than the natural vibration period, further including (7) means for correcting the drive pattern, in such manner that the duration of the acceleration or slowdown period coincides with the natural vibration period, under the condition that acceleration is constant in the acceleration or slowdown period.

By each of the foregoing methods, it is possible to eliminate any vibration, which might remain after the moving part has been accelerated and slowed down, of an industrial robot by combining two suitable vibrations which have occurred in the moving part and then setting such a condition that these two vibrations are inverted in phase with respect to each other.

Further, the method of this invention can suppress vibration without counting on feedback control so that it is not necessary to use a feedback control sensor or to cope with the high-speed processing system. It is therefore possible to provide an inexpensive and simple control system.

BRIEF DESCRIPTION OF THE DRAWINGS

FIGS. 12a–12c illustrate a damping effect due to correcting the time difference of torque peaks occurring at the time of acceleration and slowdown in the second embodiment of FIG. 9;

FIGS. 13a–13b illustrate another damping effect due to correcting the duration of each of the acceleration and slowdown periods in the second embodiment of FIG. 9;

DETAILED DESCRIPTION OF THE PREFERRED EMBODIMENTS

Figure 1:
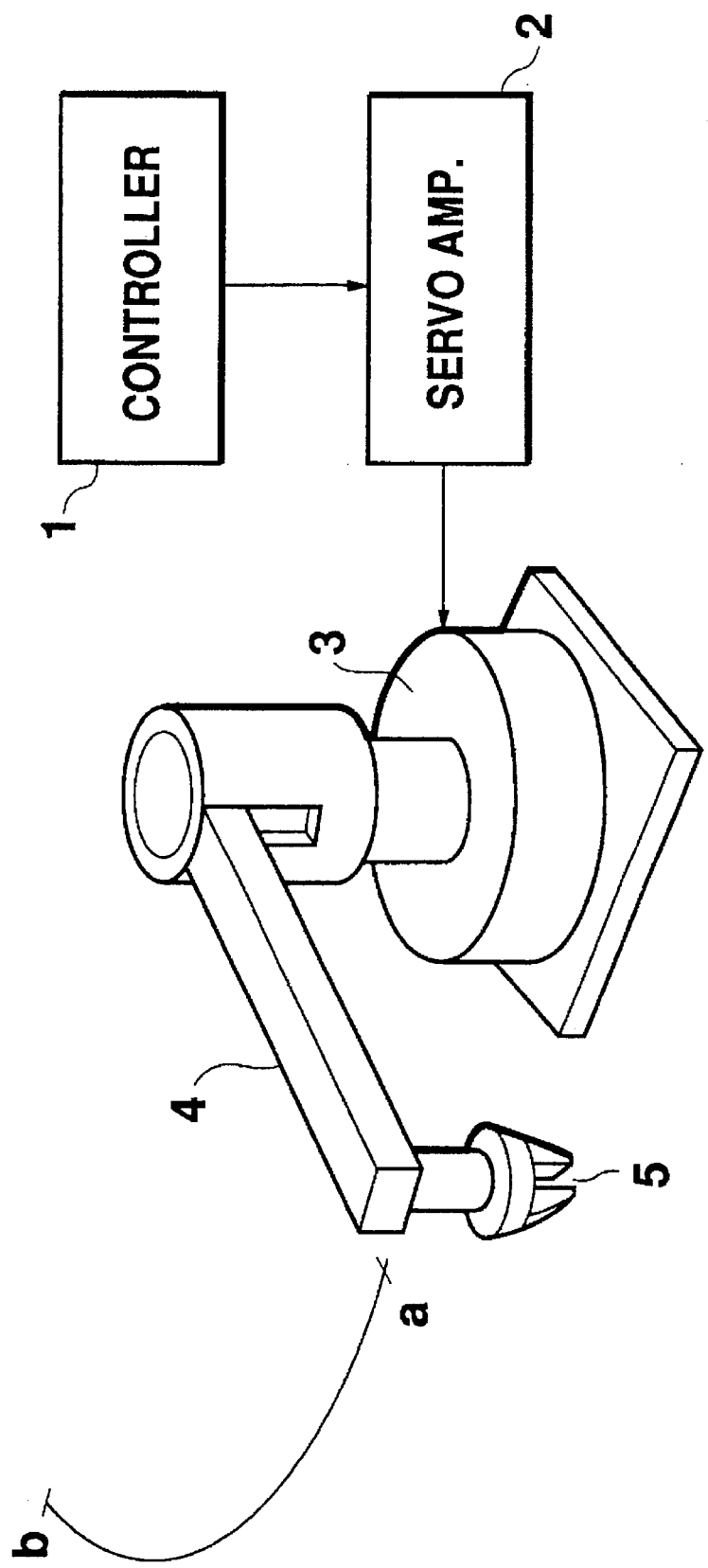
FIG. 1 is a diagram schematically showing a prior art apparatus.
Figure 2:
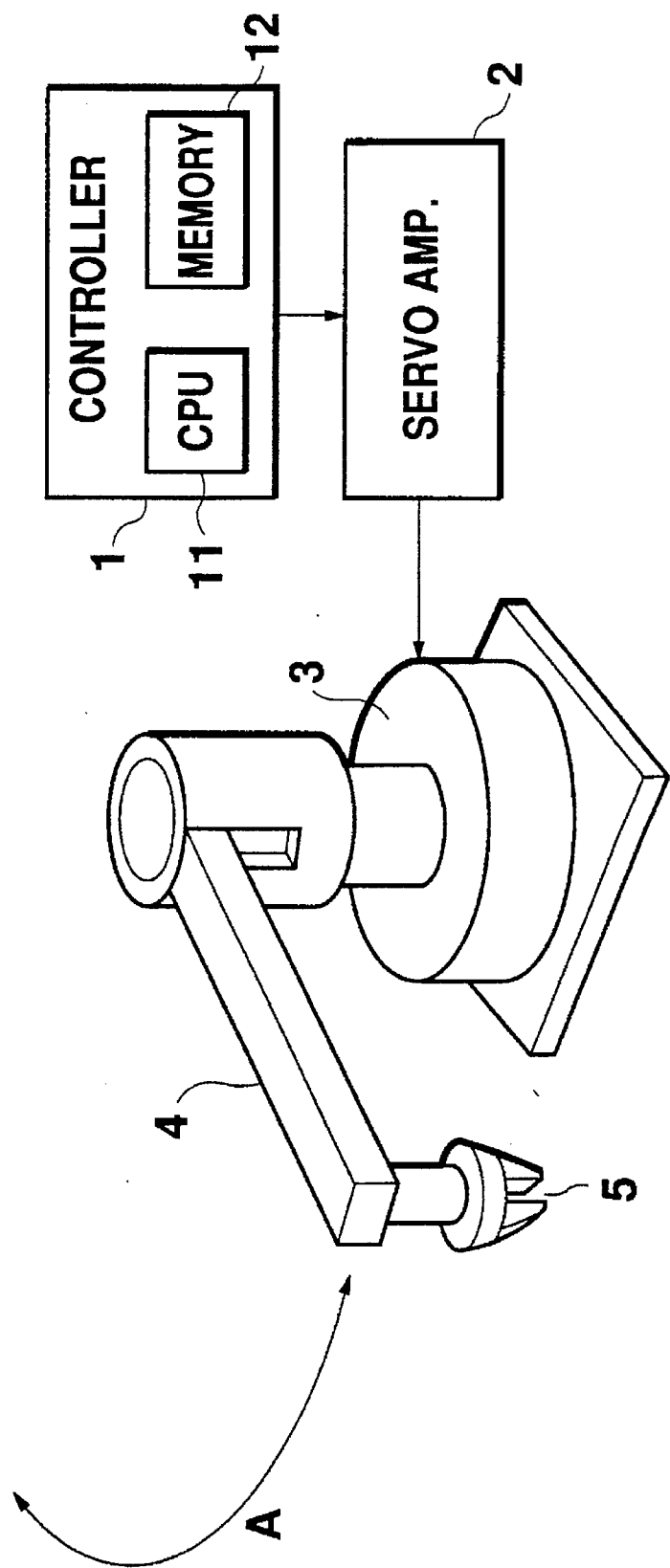
FIG. 2 is a diagram schematically showing an apparatus according to a first embodiment of this invention.

Preferred embodiments of this invention will now be described with reference to the accompanying drawings. FIG. 2 shows an industrial robot apparatus according to this invention; elements or parts similar to those of the prior art apparatus are designated by like reference numerals and their descriptions are omitted here. The apparatus is characterized in that a controller 1 comprises a central processing unit (CPU) 11 for performing a below-described arithmetic process, and a memory 12 for storing the arithmetic result. The robot of this apparatus, like the prior art robot, can make a turning motion as indicated by an arrow A and raising and lowering motions. In the following description, however, only a single-dimensional motion, e.g. the above-mentioned turning motion, is described, for ease of understanding. According to this invention, the same control can be applied not only to the illustrated example enabling a turning motion but also to an alternative example enabling a linear motion.

Figure 3A:
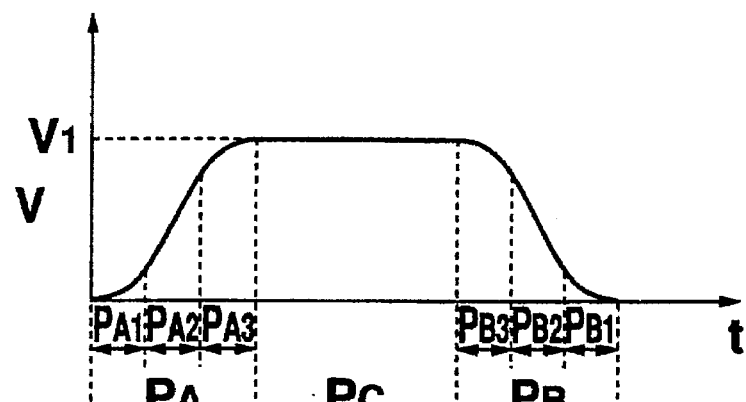
FIGS. 3a–3c show a speed instruction pattern of the apparatus of the first embodiment of FIG. 2.
Figure 3B:
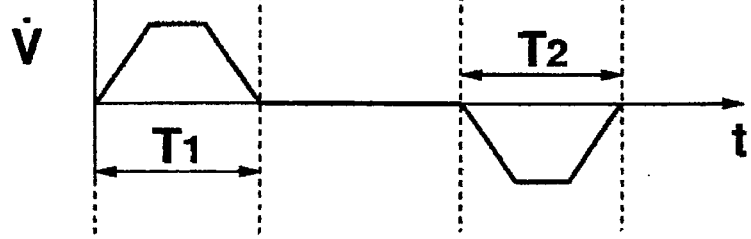
Figure 3C:
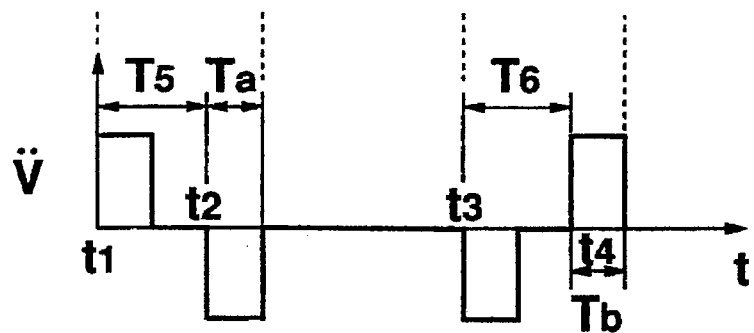

FIGS. 3a–3c show a drive pattern, for controlling a robot hand, according to this apparatus, and more particularly a speed instruction pattern and a speed time differential value at that time and a secondary time differential value. In the graph (a), the speed instruction value v for controlling the moving speed of a finger portion 5 is shown with respect to time t plotted on the x axis. In the graph (b), the primary differential value v (') with respect to time of the speed instruction value v is shown, namely, acceleration. In the graph (c), the secondary differential value v (") with respect to time of the speed instruction value v is shown. The secondary differential value v (") of the graph (c) is the primary differential value with respect to time of the acceleration v (') of the graph (b), representing the rate of change of acceleration.

The speed instruction, as shown in FIG. 3a, includes an acceleration period $P_A$ in which the robot hand is accelerated from a rest state to a predetermined speed $v_1$, a constant speed period $P_C$ in which the robot hand is moved at a predetermined speed $v_1$, and a slowdown period $P_B$ in which the robot hand is slowed down from the predetermined speed $V_1$ to a stopped state. This embodiment is characterized in that the acceleration period $P_A$ further includes an acceleration constant increase period $P_{A1}$ in which acceleration increases with respect to time by a constant rate, a constant acceleration period $P_{A2}$ in which acceleration is constant, and an acceleration constant decrease period $P_{A3}$ in which acceleration decreases with respect to time by a constant rate. Likewise, the slowdown period $P_B$ includes an acceleration constant increase period $P_{B1}$, a constant acceleration period $P_{B2}$ and an acceleration constant decrease period $P_{B3}$.

When acceleration varies with respect to time by a constant rate, the change of speed is represented by a second order curve. When acceleration is constant with respect to time, the change of speed is represented by a straight line. Therefore, in the speed instruction value of FIG. 3a, the acceleration period $P_A$ and slowdown period $P_B$ are represented by a shape in which two second order curves are connected by a straight line.

If the robot hand is controlled in such a speed control pattern, a vibration causing force, which is a cause for vibration, acts on the robot hand at each of time points $t_1$, $t_4$ at which the primary differential value v (") of acceleration rises and at each of time points $t_2$, $t_3$ at which the primary differential value v (") of acceleration falls. Since the vibrations occurring at the rise and fall portions are inverted in phase with respect to each other, the vibration occurring at the preceding time point is canceled by the vibration causing force occurring at the succeeding time point if the time difference (hereinafter called "the vibration causing time difference") at the rise time point and the fall time point coincides with the natural vibration period of the robot hand. Specifically, in the acceleration period $P_A$, the vibration of the natural vibration period occurring at the time point $t_1$, in which the primary differential value v (") of acceleration rises, interferes with the vibration occurring at the time point $t_2$, to suppress vibration. Accordingly, as the vibration causing time difference $T_s$ from the rise time point $t_1$ to the fall time point $t_2$ is an integral number times the natural vibration period, two vibrations inverted in phase interfere with and cancel each other. Likewise, in the slowdown period $P_B$, as the vibration causing time difference of the rise and fall time points $t_3$, $t_4$ is an integral number times the natural vibration period, the two vibrations occurring at the two time points $t_3$, $t_4$ can interfere with and cancel each other. Therefore, after the constant speed period $P_C$ and the stopping, it is possible to suppress vibration of the finger portion 5 of the robot arm.

Figure 4:
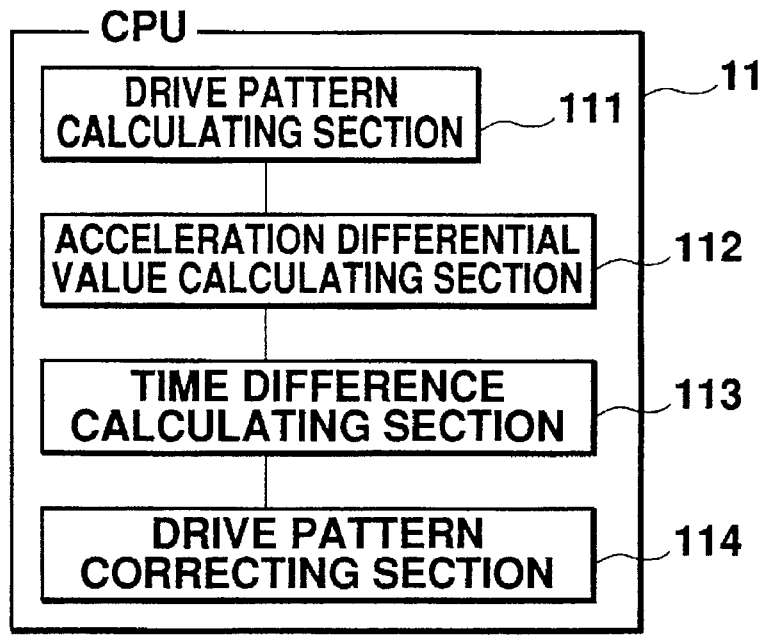
FIG. 4 is a block diagram showing a CPU of the embodiment of FIG. 2 in detail.

FIG. 4 shows the CPU 11 of the first embodiment in detail. According to a control program for controlling the arm of the industrial robot, a drive pattern is calculated in a drive pattern calculating section 111. In this embodiment, the drive pattern at this time point is a drive pattern composed of a constant acceleration motion and a constant speed motion. In an acceleration differential value calculating section 112, a differential value v (") of acceleration with respect to time is calculated so that the rise and fall portions are calculated. At the time point at which this differential value v (") varies sharply, vibration occurs. Further, the time differences $T_1$, $T_2$ of the rise and fall portions are calculated in a time difference calculating section 113. Based on this time difference, the drive pattern is corrected in a drive pattern correcting section 114.

Figure 5:
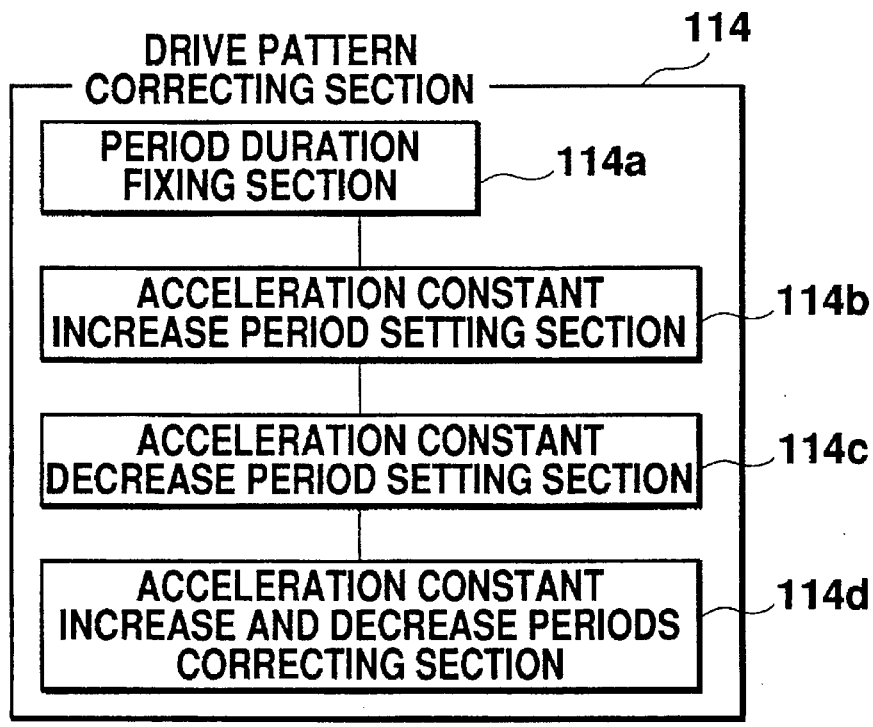
FIG. 5 is a block diagram showing a drive pattern correcting section of the CPU of FIGS. 2 and 4.

FIG. 5 shows the drive pattern correcting section 114 of the CPU 11 of this embodiment in detail. In a period duration fixing section 114a, the duration of each of the acceleration and slowdown periods $P_A$, $P_B$ calculated in the drive pattern calculating section 111 is fixed. Each of the acceleration and slowdown periods $P_A$, $P_B$ includes an acceleration constant increase period $P_{A1}$, $P_{B1}$ in which acceleration increases by a constant rate, an acceleration constant decrease period $P_{A3}$, $P_{B3}$ in which acceleration decreases by a constant rate, and a constant acceleration period $P_{A2}$, $P_{B2}$ in which acceleration is constant. The periods $P_{A1}$, $P_{B1}$, $P_{A3}$, $P_{B3}$, $P_{A2}$, $P_{B2}$ are set in setting sections 114b, 114c. Finally, the duration of each of the acceleration and slowdown periods $P_A$, $P_B$ is set in such a manner that the time differences $T_5$, $T_6$ between the start time points $t_1$, $t_4$ of the acceleration constant increase periods and the start time points $t_2$, $t_3$ of the acceleration constant decrease periods coincide with an integral number times the natural vibration period of the robot arm, thus correcting the drive pattern.

Figure 6:
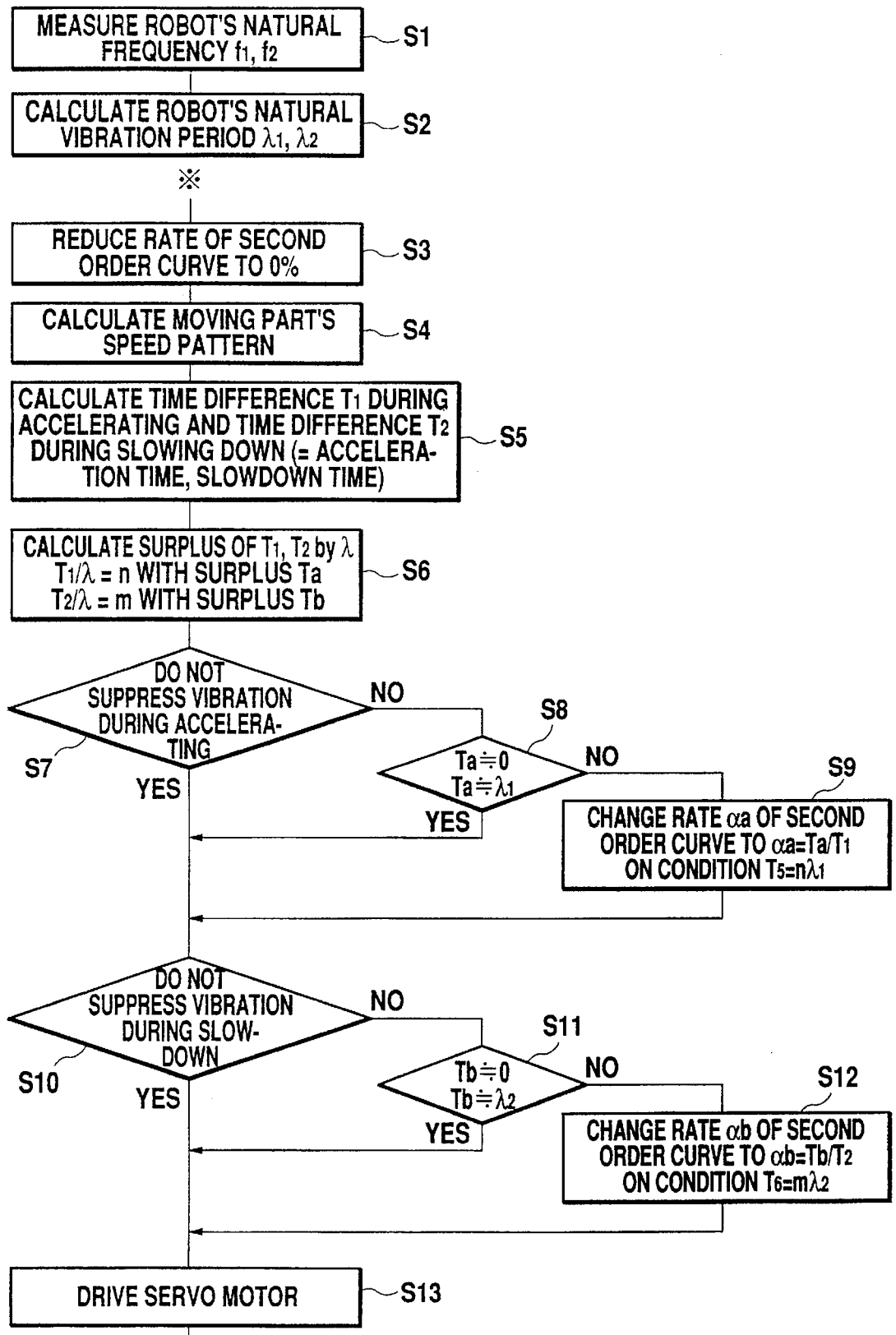
FIG. 6 is a flowchart showing a control system of the apparatus according to the first embodiment.

FIG. 6 is a flowchart showing the control of this embodiment. Steps S1, S2 are set previously. In Step S1, a natural vibration frequency f of a system including a movable part, such as an arm 4 and a finger portion 5, of the industrial robot is measured. Based on the natural vibration frequency f, a natural vibration period λ as a free vibration period of the system is calculated. The natural vibration period λ can be calculated as a reciprocal number of the natural vibration frequency f.

In the actual operation, the natural vibration frequency f varies according to the position and posture of the robot arm 4 as well as the load due to the weight of a workpiece gripped by the finger portion 5. Consequently, the natural vibration frequency is measured, according to need, under a number of conditions for each of the position, the posture and the load. In the case of the robot arm 4 of FIG. 2, since the natural vibration frequency does not vary largely depending on the turning position, it is necessary to measure the natural vibration frequency in a typical vertical position. In the case of the robot hand which moves straightly on a cantilevered support bar, since the rigidity of the system presumably varies largely depending on the position, it is necessary to measure the natural vibration frequency at at least two points near the start and end points of movement of the system. This frequency measuring is carried out by actually driving the robot arm 4 and detecting the output of an acceleration sensor mounted on the robot arm 4 near its distal end. Alternatively it may be obtained by measuring the motion of the distal end of the robot arm 4 by an optical measuring device. The thus measured natural vibration frequency of the system is then stored in the memory 12 via the CPU 11 of the controller 1 of FIG. 2.

Then in step S2, the CPU 11 computes the natural vibration period by recalling from the memory 12 the stored natural vibration frequency. Since the period is the reciprocal number of the vibration frequency, it is calculated and is then stored again in the memory 12.

The manner in which natural vibration frequencies $f_1$, $f_2$ are measured at the start and end points of a motion of the robot, and the manner in which natural vibration periods $\lambda_1$, $\lambda_2$ are calculated based on the measured frequencies $f_1$, $f_2$, will now be described.

In step S3 and subsequent steps, conditions are set as the control pattern for actually operating the robot arm. In step S3, a speed pattern, at the time of acceleration and slowdown, is set such that the second order curve portions ($P_{A1}$, $P_{A3}$) are removed. In step S4, the speed pattern is calculated under this set condition. Accordingly, only the straight speed pattern devoid of second order curves in the acceleration and slowdown periods is calculated, and as a result, the speed pattern from the operation start point to the operation stop point assumes a trapezoidal shape. Namely, a pattern in which the robot arm is accelerated at a constant acceleration from a rest state to a predetermined speed, and is then slowed down at a constant acceleration from the predetermined speed to a rest state, is set. In this case, the acceleration start time point, the acceleration end time point, the slowdown start time point and the slowdown end time point are vibration occurrence time points. The speed instruction value v and its primary and secondary differential values v ('), v (") are shown in FIG. 4.

In the next step S5, the vibration causing time differences $T_1$, $T_2$ of the acceleration and slowdown periods $P_A$, $P_B$ are calculated based on the obtained speed pattern. In the acceleration and slowdown periods $P_A$, $P_B$, since acceleration is constant all times, the rise and fall of the differential value of the acceleration occur at the start and end time points of the periods. Therefore, the vibration causing time differences $T_1$, $T_2$ become equal to the duration of the acceleration period $P_A$ and the duration of the slowdown period $P_B$, respectively.

Then in step S6, the surplus of the calculated duration $T_1$, $T_2$ of each of the acceleration and slowdown periods is calculated by each of the natural vibration periods $\lambda_1$, $\lambda_2$ at the respective points. Namely, since the acceleration period exists near the operation start point, the surplus of the acceleration period is calculated by the natural vibration period $\lambda_1$. Since the slowdown period exists near the operation end point, the surplus of the slowdown period is calculated by the natural vibration period $\lambda_2$. This calculation is expressed by the following equations:

$$T_1/\lambda_1 = n \text{ with surplus } T_a \quad (1)$$

$$T_2/\lambda_2 = n \text{ with surplus } T_b \quad (2)$$

In step S7, selection is made as to whether or not vibration should be suppressed during acceleration. In the constant speed period $P_C$, no work takes place, and only the finger portion 5 is moved. Also, if the vibration occurring during acceleration attenuates, to exert an influence in the slowdown period, no problem would arise even when vibration occurs during acceleration. In such an event, therefore, it is not necessary to suppress vibration. Then the procedure goes to step S10. On the other hand, if any work takes place in the constant speed period $P_C$, it is necessary to suppress the vibration which might occur during acceleration. Also, if the constant speed period $P_C$ is relatively short and the vibration occurring during acceleration remains during slowdown, to exert influence, it is necessary to suppress the vibration.

If it is necessary to suppress vibration, the procedure goes to step S8, in which judgment is made as to whether the surplus $T_a$ is substantially equal to 0 or substantially equal to the natural vibration period $\lambda_1$. In other words, judgment is made as to whether or not the duration of the acceleration period $P_A$ is substantially an integral number times the natural vibration period $\lambda_1$. If the surplus $T_a$ is judged to substantially equal 0 or substantially equal $\lambda_1$, the vibrations occurring in the start and end points in the acceleration period cancel each other, so that it is not necessary to change the speed pattern. In this case, the procedure goes to step S10. If the foregoing conditions are not satisfied, since the vibration occurring in the acceleration period remains in a succeeding period, to exert an influence, it is necessary to change the speed pattern so as to suppress vibration. In this case, procedure goes to step S9, in which correction is made to the speed pattern including the second order curve of the graph (a) of FIG. 3. Correction is made to the speed pattern in such a manner that the vibration causing time difference $T_5$ of the rise and fall of the acceleration differential value v (") shown in the graph (c) of FIG. 3 is an integral number times the natural vibration period $\lambda_1$ ($T_5=n\lambda_1$). Namely, as set in step S3, the rate of the second order curve to the acceleration period is changed to 0%. The rate $\alpha_a$ is expressed by the following equation wherein $T_1$ is the duration of the acceleration period and $T_a$ is the surplus in the equation (1).

$$\alpha_a = T_a/T_1 \qquad (3)$$

The duration of each of the acceleration constant increase period $P_{A1}$ and acceleration constant decrease period $P_{A3}$ is defined as $T_a$, and the speed pattern is calculated in such a manner that the second order curve of these periods and the straight portion of the constant acceleration period $P_{A2}$ are smoothly connected together. Upon termination of this calculating, procedure goes to step S10.

In step S10, judgment is made as to whether or not is necessary to suppress vibration during slowdown. Similarly to the vibration suppression during acceleration, if there is no influence on the succeeding control, no correction is made to the speed pattern. For example, if no work takes place while the robot arm is stopped, no problem arises if vibration remains, and therefore it is not necessary to correct the speed pattern. If judgment is made that no correction is necessary, the procedure goes to step S13. On the other hand, if it is necessary to suppress vibration in, for example, fastening bolts at the stop point, the procedure goes to step S11. In step S11, judgment is made as to whether the surplus $T_b$ of the equation (2) is substantially equal to 0 or substantially equal to the natural vibration period $\lambda_2$. In either case, since the vibrations occurring respectively at the start and end time points of the slowdown period are inverted in phase with respect to each other, these vibrations interfere with each other to suppress vibration. Since no correction is necessary to suppress a fresh vibration, the procedure goes to step S13. In step S11, if it is not judged that the surplus $T_b$ is substantially equal to 0 or substantially equal to the natural vibration period $\lambda_2$, the procedure goes to step S12. In step S12, the rate $\alpha_b$ of the second order curve portion is set in such a manner that the vibration causing time difference $T_6$ from the fall $t_3$ to the rise $t_4$ of the acceleration differential value v (") of the slowdown period is an integral number times the natural vibration period $\lambda_2$. This rate $\alpha_b$ is expressed by the following equation where $T_1$ is the duration of the acceleration period and $T_b$ is the surplus in the equation (1).

$$\alpha_b = T_b/T_1 \qquad (4)$$

The duration of each of the acceleration constant increase period $P_{B1}$ and acceleration constant decrease period $P_{B3}$ is defined as $T_b$, and the speed pattern is calculated in such a manner that the second order curve portion of these periods and the straight portion of the constant acceleration period $P_{B2}$ are smoothly connected with each other. Upon termination of this calculating, the procedure goes to step S13.

Figure 7A:
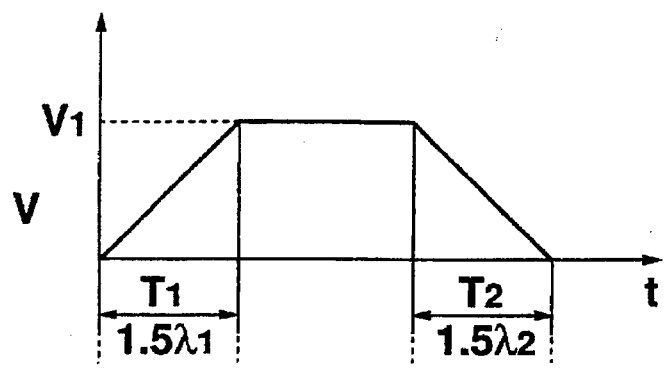
FIGS. 7a–7d show a speed instruction, prior to vibration suppressing control, and a vibration occurring due to the speed instruction in the apparatus of the first embodiment.
Figure 7B:
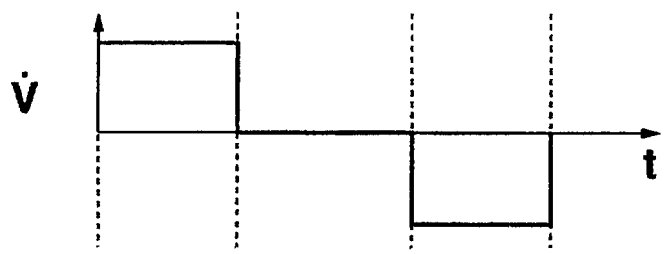
Figure 7C:
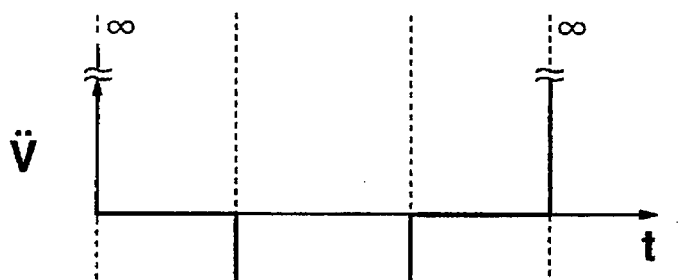
Figure 7D:
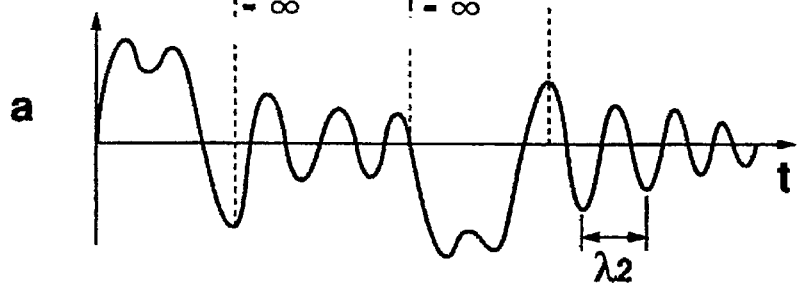
Figure 8A:
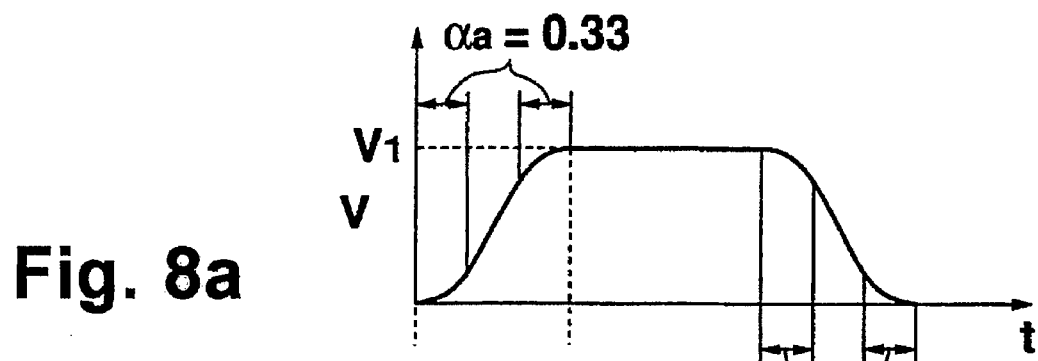
FIGS. 8a–8d show another speed instruction, prior to vibration suppressing control, and another vibration occurring due to the speed instruction in the apparatus of the first embodiment.
Figure 8B:
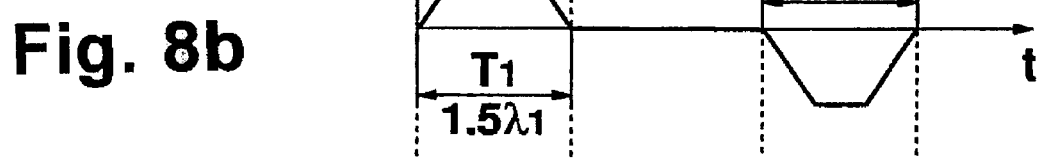
Figure 8C:
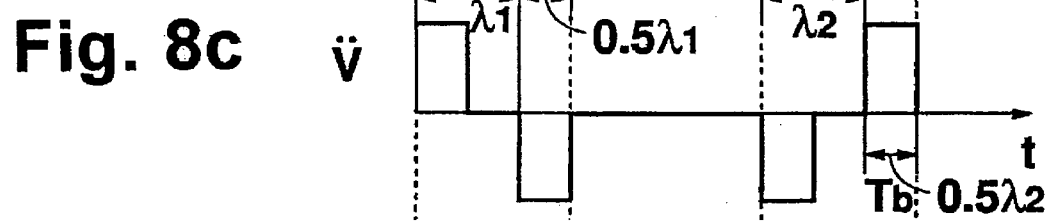
Figure 8D:
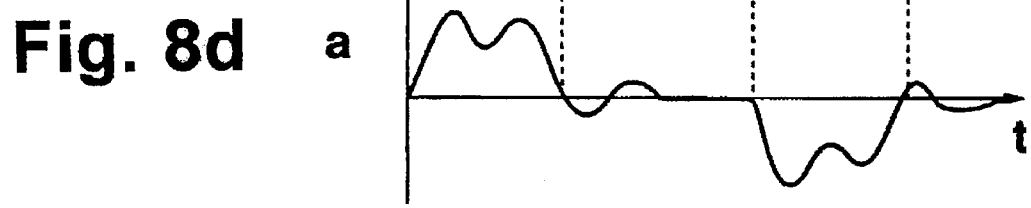

FIGS. 7a–7d and FIGS. 8a–8d show the speed instruction value v, the acceleration v (') and the primary differential value v (") of the acceleration if the robot arm has a long stroke and is moved in such a manner that the durations of the acceleration and slowdown periods are equal to each other. The graph (d) of FIG. 7 and the graph (d) of FIG. 8 show the acceleration a of vibration of the robot arm end controlled by the speed instruction pattern. The graphs (a)–(d) of FIG. 7 show the speed instruction pattern before correction for suppressing vibration is made. The graphs (a)–(d) of FIG. 8 show the speed pattern after correction. In FIG. 7a, the duration of each of the acceleration and slowdown periods $T_1$, $T_2$ is one and a half times the respective natural vibration period $\lambda_1$, $\lambda_2$. At that time, the vibrations occurring at the rise and fall of the acceleration time differential value coincide in phase with each other. In this case, the vibration remains in the succeeding period to exert influence on the work in that period. In order to prevent the vibration from remaining, correction for the above-mentioned speed instruction pattern is executed. Regarding the acceleration period, the value of the second order curve $\alpha_a$ (=33%) is calculated by substituting for the equation (3) the surplus $T_a$ (=0.5 $\lambda_1$) of calculation of the equation (1) and the acceleration period $T_1$ (=1.5 $\lambda_1$). Likewise, in the slowdown period, $\alpha_b$=33%. Thus the rates $\alpha_a, \alpha_b$ of the second order curves are calculated, and the speed instruction pattern calculated based on the rates is shown in the graph (a) of FIG. 8. According to this speed instruction pattern, the vibration causing time differences $T_5$, $T_6$ coincide with the respective natural vibration periods $\lambda_1$, $\lambda_2$. Therefore, as mentioned above, the vibrations occurring at the rise and fall time points mutually interfere to cancel each other out. It is accordingly possible to reduce the remaining vibration of the graph (d) of FIG. 7 largely as shown in the graph (d) of FIG. 8.

In the foregoing description, the vibration causing time differences $T_5$, $T_6$ after correction are equal to (onefold) the respective natural vibration periods $\lambda_1$, $\lambda_2$. Alternatively, motion of the robot arm may be controlled in such a manner that the corrected vibration causing time difference $T_5$, $T_6$ is an integral number (2 or more) times the natural vibration period $\lambda_1$, $\lambda_2$, thus obtaining a vibration suppressing effect.

As mentioned above, without extending the acceleration and slowdown periods, it is possible to suppress the remaining vibration. Accordingly, it is possible to prevent the precision of robot drive control from lowering due to the remaining vibration so that the quality of products is prevented from being deteriorated. Further, partly since it is not necessary to wait to do the work until the remaining vibration has attenuated, and partly since it is unnecessary to extend the acceleration and slowdown periods in order to suppress vibration, the work time can be minimized.

Since the control of this embodiment is not feedback control, it is not necessary to use a sensor for detecting a state of motion of the moving part. Further, since the control system does not have to be high-speed, it is possible to achieve vibration suppressing control at low cost. Still further, since a vibration suppressing effect can be achieved by optimizing the speed instruction, it is possible to cope with the existing apparatus without difficulties.

In this embodiment, each time the speed instruction value is corrected, the rate $\alpha$ of the second order curve is calculated, and a speed instruction pattern linking the second order curve portions and the straight portions together smoothly is calculated. Alternatively, the optimum pattern may be selected from a number of kinds of speed instruction patterns prepared in correspondence with the rate $\alpha$ of the second order curve.

A second embodiment of this invention will now be described. In the foregoing embodiment, if the duration of each of the acceleration and slowdown periods $T_1$, $T_2$ is shorter than the respective natural vibration period $\lambda_1$, $\lambda_2$, it is impossible for the vibration causing time difference to coincide with the natural vibration period. If the acceleration period and the slowdown period are close to each other, it is possible to suppress the vibration, which occurs in the acceleration period, by the vibration causing force in the slowdown period. In the second embodiment, vibration suppressing control taking due consideration of this case is carried out.

Figure 9:
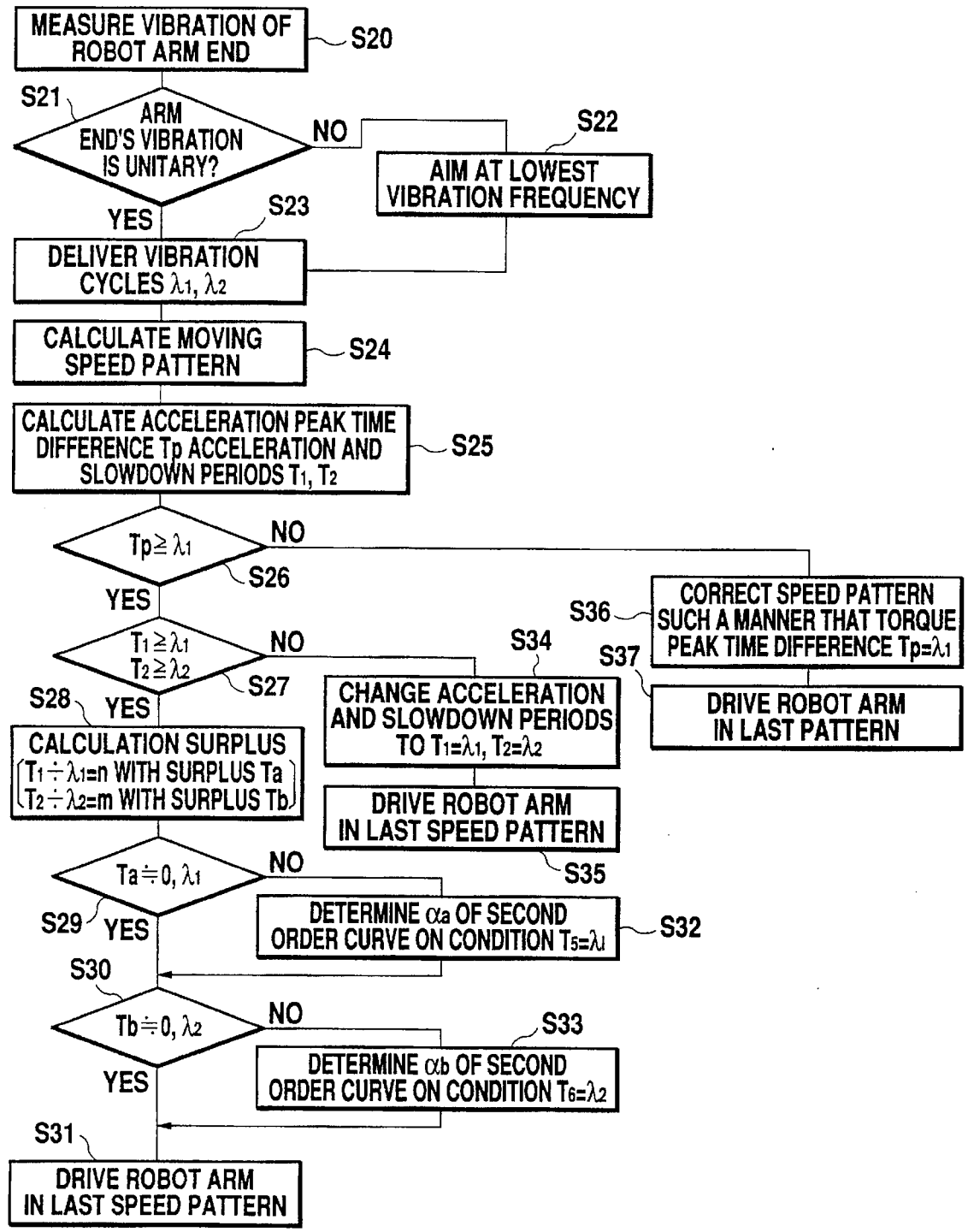
FIG. 9 is a flowchart showing another control system according to a second embodiment of this invention.

FIG. 9 is a flowchart of vibration suppressing control of this embodiment. First of all, in step S20, the vibration of the distal end of the robot arm 4 is measured. In step S21, the measured vibration is frequency-analyzed, and a judgment is made as to whether the frequency of the vibration includes a single frequency or a plurality of frequencies. In the case of a single frequency, this frequency is regarded as the natural vibration frequency of the system. In the case of plural frequencies, the lowest frequency is regarded as the natural vibration frequency of the system in step S22. In step S23, the natural vibration period is calculated as the reciprocal number of the natural vibration frequency.

The calculation of this natural vibration period is conducted at two points, i.e. the start and end points, if controlling takes place on a single motion. Namely, the natural vibration period $\lambda_1$ at the motion start point and the natural vibration period $\lambda_2$ at the motion end point are calculated. If controlling takes place on many motions, in a controlling method, a vibration is measured at the start and end points of each motion, and the results of measurement are stored. In another controlling method, vibration is measured at a typical point and with respect to a typical load to formulate an estimation equation, and the natural vibration is obtained based on the estimation equation in the actual controlling. In the former method, vibration measurement is conducted for every motion in the actual work to obtain the natural vibration period, and when calculating the speed instruction value, data relating to the motion is recalled and the speed instruction pattern is corrected, if necessary. In the latter method, vibration measurement is conducted at a typical point and with respect to a typical load to formulate an estimation equation, and the natural vibration period is calculated from the actual motion, based on this estimation equation. According to the latter method, it is not necessary to conduct vibration measurement for a new motion. If the motions are limited to a small number, however, it is desirable to actually measure vibration similarly to the former method.

Figure 10A:
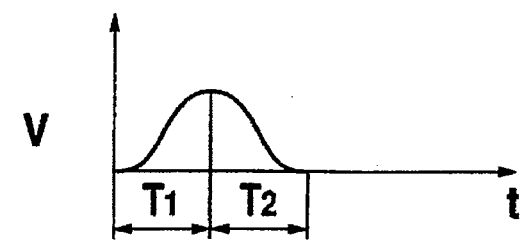
FIGS. 10a–10c show a typical speed instruction pattern in which a robot arm end is accelerated and then quickly slowed down with no constant speed period, and an amplitude of the robot arm end at that time.
Figure 10B:
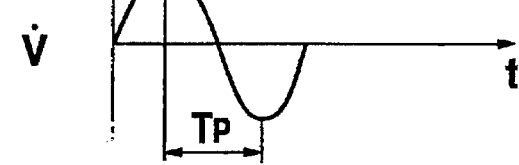
Figure 10C:
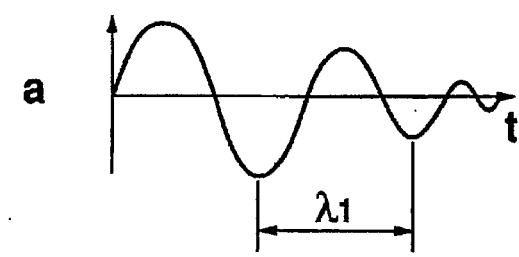

Then in step S24, moving speed patterns are calculated as the speed instruction values. These patterns are chiefly divided into two groups, one shown in the graph (a) of FIG. 10 and the other shown in the graph (a) of FIG. 11. The pattern of the graph (a) of FIG. 10 is devoid of a constant speed period and has a short moving distance, and in this pattern the speed is slowed down before reaching the maximum. The graphs (b) and (c) of FIG. 10 show the acceleration and vibration of the robot arm end when the motion is performed according to the speed instruction of the graph (a) of FIG. 10. In several diagrams, $T_p$ stands for the time difference of acceleration peaks with the torque at peak. In step S25, the time difference $T_p$ of acceleration peaks and the duration $T_1$, $T_2$ of each of the acceleration and slowdown periods are calculated.

Figure 11A:
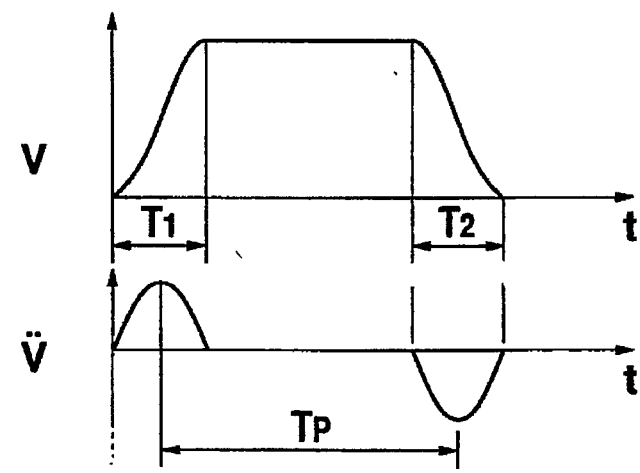
FIGS. 11a–11c show another typical speed instruction pattern in which the robot arm end is accelerated, then moved at a constant speed for a predetermined time and finally slowed down, and an amplitude of the robot arm end at that time.
Figure 11B:
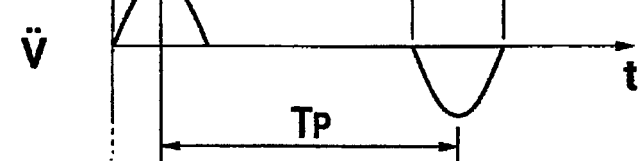
Figure 11C:
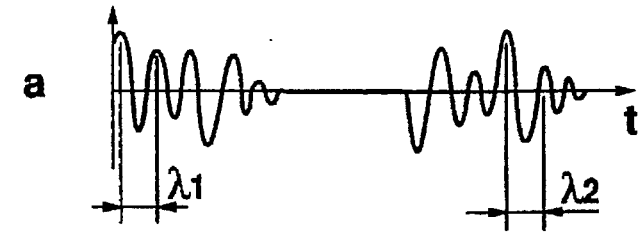

In step S26, a judgment is made as to whether or not the acceleration peak time difference $T_p$ is larger than the natural vibration period $\lambda_1$ at the motion start point, thereby discriminating whether the speed pattern is classified as the group of the graph (a) of FIG. 10 or the graph (a) of FIG. 11. If the acceleration peak time difference $T_p$ is judged not larger than the natural vibration period $\lambda_1$, it is possible that the vibrations occurring in the acceleration and slowdown periods interfere to cancel each other, as the acceleration and slowdown periods are close to each other. This condition is that the time difference of torque peaks occurring in each of the acceleration and slowdown periods coincides with the natural vibration period. The torque peak and the acceleration peak substantially coincide with each other, and therefore in step S36, the speed instruction pattern is corrected in such a manner that the acceleration peak time difference $T_p$ coincides with the natural vibration period $\lambda_1$.

FIGS. 12a–12c show an example of control in which the speed instruction pattern is corrected. The speed instruction indicated by a dotted line in the graph (a) of FIG. 12 is such that the time difference $T_p$ of torque peaks in the acceleration and slowdown periods is equal to a half of the natural vibration period $\lambda_1$ (i.e. $T_p = \lambda_1/2$). In this case, the acceleration shown in the graph (b) of FIG. 12 varies so that the vibrations occurring in the acceleration and slowdown periods are uniform in phase, thus amplifying vibration. Then, as indicated by a solid line in the graph (a) of FIG. 12, the torque peak time difference $T_p$ such as to coincide with the natural vibration period, is set by extending the time duration between acceleration and slowdown, thereby suppressing vibration as shown in the graph (c) of FIG. 12. Then, the motion according to the pattern corrected in step S37 is made. In such a case, because the natural vibration period does not substantially vary at the motion start and end points as the moving distance is small, only the natural vibration period at the start point is taken into consideration.

If the acceleration peak time difference $T_p$ is judged to be larger than the natural vibration period $\lambda_1$, the speed instruction pattern at that time is shown in the graph (a) of FIG. 11. In step S27, the duration $T_1$, $T_2$ of each of the acceleration and slowdown periods is judged to be larger than the respective natural vibration period $\lambda_1$, $\lambda_2$. If the period duration $T_1$, $T_2$ is judged to be not larger than the respective natural vibration period $\lambda_1$, $\lambda_2$, it is impossible for the vibration causing time difference to come into coincidence with the natural vibration period in the corresponding period as described in the previous embodiment. Namely, in the previous embodiment, the vibration causing time difference is reduced to coincide with the natural vibration period by providing acceleration constant increase and decrease periods represented by second order curves. In the case of the above-mentioned condition, because the duration of each of the acceleration and slowdown periods is shorter than the natural vibration period, the vibration causing time difference cannot be brought into coincidence with the natural vibration period by reducing the vibration causing time difference further. Consequently, in step S34, the vibration causing time differences $T_1$, $T_2$ are brought into coincidence with the respective natural vibration periods $\lambda_1$, $\lambda_2$ by extending the acceleration period and the slowdown period. The speed instruction pattern at that time does not include the acceleration constant increase and decrease periods represented by second order curves in the acceleration and slowdown periods, namely, assuming a trapezoidal shape like the conventional art. It is thereby possible to achieve a vibration suppressing control as the vibrations occurring at the start and end points in each of the acceleration and slowdown periods interfere with each other.

FIGS. 13a–13b show another example of control in which the speed instruction pattern is corrected. The speed instruction pattern, before correction, indicated by a dotted line in the graph (a) of FIG. 13 is equal to a half of the respective natural vibration period $\lambda_1$, $\lambda_2$ in each of the acceleration and slowdown periods $T_1$, $T_2$. In this example, the duration from the acceleration period to the slowdown period is adequately long. In this case, as indicated by the dotted line in the graph (b) of FIG. 13, the vibrations occurring in the start and end points in the acceleration period are amplified by each other, and this is also the case with the slowdown period. As mentioned above, in such a case, correction is made in such a manner that the duration of each period $T_1$, $T_2$ coincides with the respective natural vibration period $\lambda_1$, $\lambda_2$. The thus corrected speed instruction pattern is shown by a solid line of the graph (a), in which the acceleration and slowdown periods are extended in such a manner that $T'_1$ $(=\lambda_1)$, $T'_2$ $(=\lambda_2)$. At that time, as indicated by a solid line of the graph (b), the vibrations occurring at the start and end points in each period are canceled by each other to suppress vibration.

In step S27, if each vibration causing time difference $T_1$, $T_2$ is judged to be larger than the respective natural vibration period $\lambda_1$, $\lambda_2$, it is possible to make each vibration causing time difference $T_1$, $T_2$ coincide with the respective natural vibration period $\lambda_1$, $\lambda_2$ by reducing $T_1$, $T_2$, similarly to the previous embodiment. In step S28, the surpluses are calculated as the equations (1), (2) of the previous embodiment. In step S29, it is judged as to whether or not the surplus $T_a$ relating to the acceleration period is substantially equal to 0 or $\lambda_1$. If it is equal, since the vibrations occurring at the start and end points in the acceleration period interfere with each other to give a vibration suppressing effect, the speed instruction pattern is used without correction, whereupon procedure goes to step S30. On the contrary, if the surplus $T_a$ is judged to be not equal to 0 or $\lambda_1$, in step S32, the rate $\alpha_a$ of the second order curve is determined in such a manner that the vibration causing time difference $T_5$ coincides with the natural vibration period $\lambda_1$. Preferably, the vibration causing time difference $T_5$ coincides with the natural vibration period $\lambda_1$ itself and does not coincide with a 2 or greater integral number times the natural vibration period $\lambda_1$. Since the next vibration causing force is given before the vibration occurring due to the first vibration causing force attenuates, it is possible to cancel the vibration effectively.

After a speed instruction pattern of the acceleration period is determined, a speed instruction pattern in the slowdown period is estimated in step S30 and following steps. In step S30, the surplus $T_b$ in the equation (2) is judged to be substantially equal to 0 or $\lambda_2$. If it is equal, because the vibrations occurring at the start and end points in the slowdown period interfere with each other to achieve a vibration suppressing effect, the speed instruction pattern is used without correction, whereupon the procedure goes to step S31. On the contrary, if the surplus $T_b$ is judged to be substantially equal to 0 or $\lambda_2$, in step S33, the rate $\alpha_b$ of the second order curve is determined in such a manner that the vibration causing time difference $T_6$ coincides with the natural vibration period $\lambda_2$. Also in this case, the vibration causing time difference $T_6$ coincides with the natural vibration period $\lambda_2$ itself and does not coincide with a 2 or greater integral number times the natural vibration period $\lambda_2$. Since the next vibration causing force is given before the vibration occurring due to the first vibration causing force attenuates, it is possible to cancel the vibration effectively. In step S31, the robot arm is driven according to this corrected speed instruction pattern.

Figure 14:
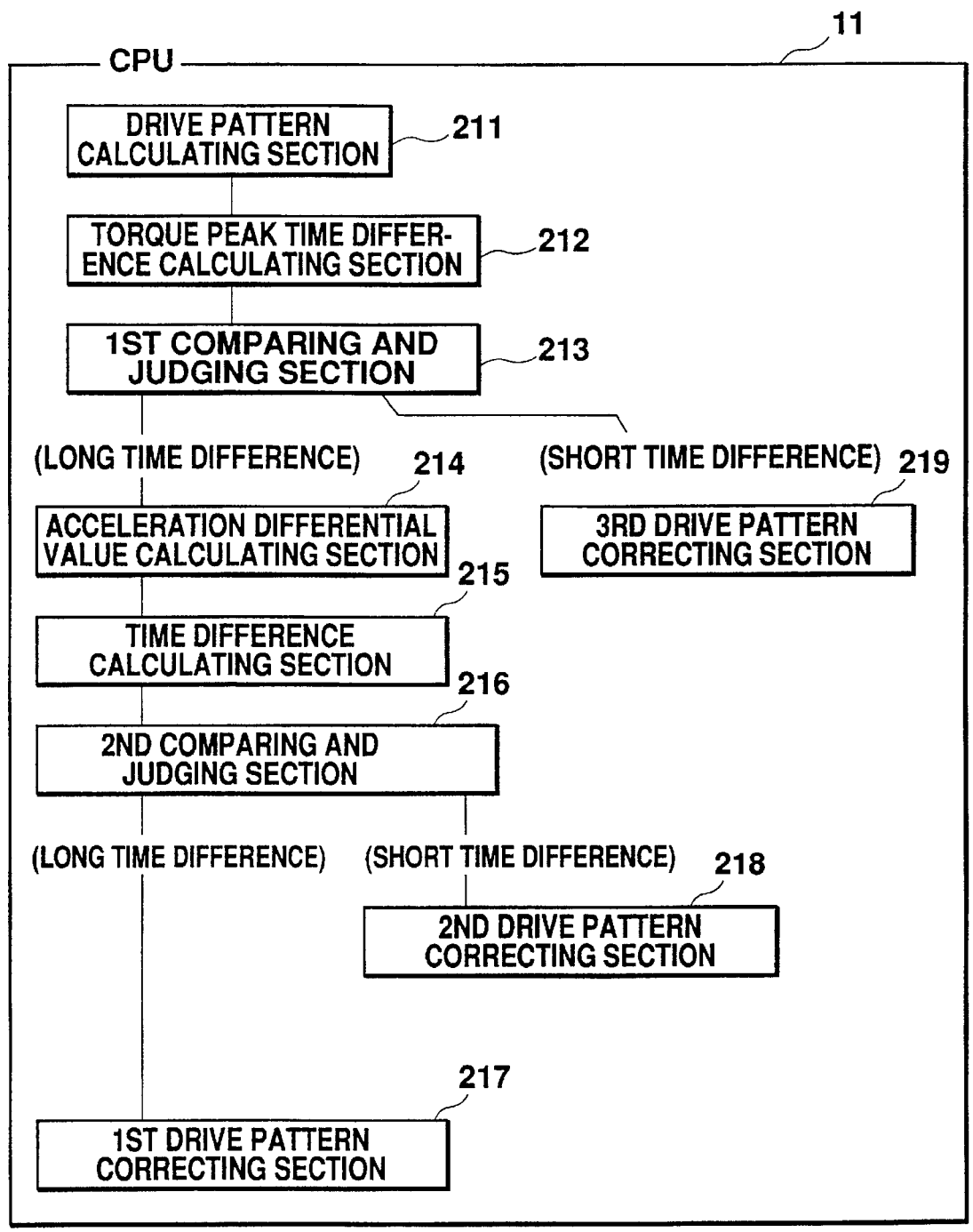
FIG. 14 is a block diagram showing a CPU of the second embodiment of FIG. 9 in detail.

FIG. 14 is a block diagram showing a CPU 11 of the apparatus according to this embodiment. The CPU 11 calculates a speed instruction pattern, as an example of drive pattern, in a drive pattern calculating section 211. The torque peak time difference of the acceleration and slowdown periods in the calculated speed instruction pattern is calculated by a torque peak time difference calculating section 212.

The resulting torque peak time difference is then compared with the natural vibration period of the system in a first comparing and judging section 213. If the torque peak time difference is judged to be larger than the natural vibration period as the result of comparison, the differential value of the acceleration with respect to time is calculated in an acceleration differential value calculating section 214 from the above-mentioned speed instruction pattern. The time difference of rise and fall portions of the differential value of each of the acceleration and slowdown periods is calculated in a time difference calculating section 215.

Then, comparison of this time difference with the natural vibration period takes place in a second comparing and judging section 216. However, in this embodiment, if the rise and fall portions of the differential value in each period substantially coincide with each other at the start and end time points of the period, comparison of the acceleration and slowdown periods with the respective natural vibration period takes place in the second comparing and judging section 216. If each of the acceleration and slowdown periods is larger than the respective natural vibration period, the drive pattern is corrected in a first drive pattern correcting section 217. The first drive pattern correcting section 217 is identical in construction and result to the drive pattern correcting section 114 of FIG. 5, so its description is omitted here.

On the other hand, if in the second comparing and judging section 216, the period duration is judged to be shorter than the natural vibration period, the drive pattern is corrected in a second drive pattern correcting section. This correction is such that the duration of the corresponding period coincides with the natural vibration period.

Further, if in the first comparing and judging section 213 the torque peak time difference is judged to be shorter than the natural vibration period, the drive pattern is corrected in a third drive pattern correcting section 219. This correction is such that the time difference of torque peaks in the acceleration and slowdown periods coincides with the natural vibration period of the system.

According to this embodiment, it is possible to perform reliable vibration suppression in various motion patterns. For example, in either of the patterns shown in the graph (a) of FIG. 10 and the graph (a) of FIG. 11, it is possible to perform individual controls in compliance with the respective characteristics so that vibration can be suppressed reliably. Further, if each of the acceleration and slowdown periods is short, the period is extended to coincide with the natural vibration period, thereby suppressing vibration. Furthermore, by having the vibration causing time difference of each of acceleration and slowdown periods in coincidence with the natural vibration period and by giving the next vibration causing force before the vibration occurring due to the first vibration causing force attenuates, it is possible to suppress vibration reliably.

Figure 15:
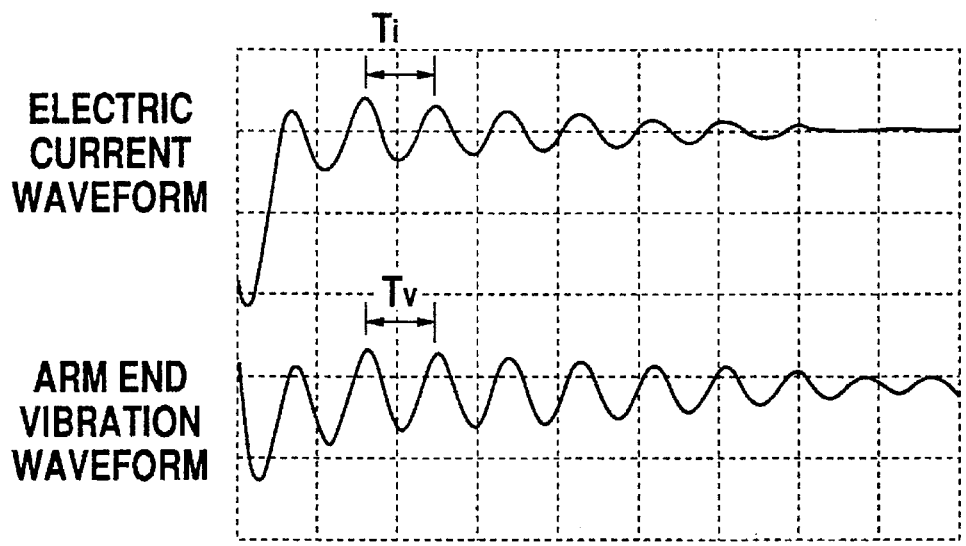
FIG. 15 is a graph showing an electric current applied to a servo motor and a vibration of the robot arm end in contact.

In each of the foregoing embodiments, the vibration of the robot hand is detected by detecting the vibration of the distal end of the robot hand by, for example, an acceleration sensor. Alternatively the vibration may be detected in terms of an amount of electric current supplied to a servo motor. If vibration occurs in the distal end of the robot arm, a force similar to the vibration waveform of a drive force acts on the servo motor to give the drive force in the direction of vibration. At that time, an electric current is supplied to the servo motor in such a manner that the servo motor generates a force against the applied force so as to hold the motor position. Accordingly, at that time the vibration waveform and the electric current waveform supplied to the servo motor substantially match with each other as shown in FIG. 15. Because their periods $T_1$, $T_y$ in particular coincide with each other, measuring only the electric current waveform suffices in measuring the natural vibration period.

Figure 16:
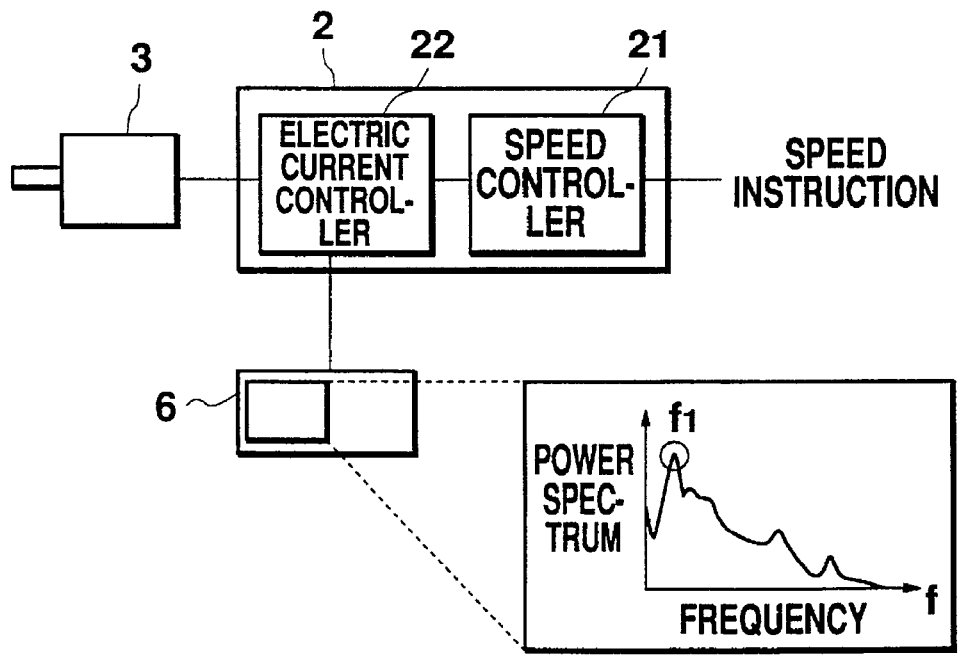
FIG. 16 is a block diagram showing an equipment which detects the value of an electric current applied to the servo motor and performs a frequency analysis.

FIG. 16 shows an apparatus for detecting an electric current to be supplied to a servo motor to calculate the natural vibration frequency. A servo amplifier 2 for controlling the servo motor 3 based on the speed instruction includes a speed controller 21 and an electric current controller 22. The electric current controller 22 controls an electric current to be supplied to the servo motor 3, and from the electric current controller 22 the waveform of a control electric current can be detected. The electric current waveform is introduced into a frequency analyzer 6 such as a fast Fourier transformer (FFT). The highest power spectral peak is then detected as the natural vibration frequency of the system. Alternatively the controller itself may have a frequency analyzing function.

In measuring the natural vibration period, by detecting an electric current waveform to be supplied to the servo motor for driving the system and regarding the fundamental frequency of the electric current waveform as the natural vibration frequency of the system, it is possible to detect the natural vibration period without the trouble of, for example, attaching an acceleration sensor.

What is claimed is:

1. A method of computing a drive pattern for suppressing vibration of a moving part of an industrial robot, comprising the steps of:
   (a) obtaining a driving pattern of the moving part of the industrial robot, which pattern includes an acceleration period, a constant speed period and a slowdown period;
   (b) calculating a differential value of acceleration with respect to time of the moving part, from said drive pattern;
   (c) calculating a time difference between a rise portion and a fall portion of said differential value of the acceleration time; and
   (d) correcting said drive pattern in such a manner that said time difference changes substantially by an integral number times a natural vibration period of the moving part.

2. A drive pattern computing method according to claim 1, wherein said drive pattern correcting step comprises fixing the duration of at least the acceleration and slowdown period, setting in said fixed duration of the acceleration or slowdown period, an acceleration constant increase period in which acceleration increases at a constant rate with respect to time, and an acceleration constant decrease period in which acceleration decreases at a constant rate with respect to time, and correcting the duration of each of said acceleration constant increase period and acceleration constant decrease period.

3. A drive pattern computing method according to claim 2, wherein said drive pattern correcting step is the step of selecting said drive pattern from a number of previously prepared drive patterns.

4. A drive pattern computing method according to claim 1, wherein said drive pattern correcting step is the step of correcting the duration of said acceleration or slowdown period, so as to be equal to said natural vibration period of the moving part, under the condition that acceleration is constant in said acceleration or slowdown period.

5. A drive pattern computing method according to claim 1, wherein said natural vibration period of the moving part is calculated by driving the moving part in a predetermined pattern by an electric motor, detecting a variation of a driving current of the electric motor, which variation is caused due to the vibration of the moving part in response to said driving, and measuring said natural vibration period of said moving part from the detected electric current waveform.

6. A method of computing a drive pattern for suppressing vibration of a moving part of an industrial robot, comprising the steps of:
   (a) obtaining a driving pattern of the moving part of the industrial robot, which pattern includes an acceleration period, a constant speed period and a slow down period; and
   (b) determining, by comparing the duration of each of said acceleration period and slowdown period of said drive pattern with a natural vibration period of the moving part, whether the duration of each of said acceleration period and slowdown period of the drive pattern is longer or shorter than said natural vibration period;
   (c) said method, if said acceleration or slowdown period is longer than said natural vibration period, further including the steps of: (1) calculating a differential value of acceleration with respect to time of the moving part from said drive pattern; (2) calculating a time difference between a rise portion and a fall portion of said differential value of acceleration with respect to time; and (3) correcting said drive pattern, in such a manner that said time difference increases substantially by an integral number times the natural vibration period of the moving part, by fixing the duration of at least the acceleration and slowdown period, setting in said fixed duration of the acceleration or slowdown period an acceleration constant increase period in which acceleration increases at a constant rate with respect to time and an acceleration constant decrease period in which acceleration decreases at a constant rate with respect to time, and correcting the duration of each of said acceleration constant increase period and acceleration constant decrease period;
   (d) said method, if said acceleration or slowdown period is shorter than said natural vibration period, further including the step of (4) correcting the duration of said acceleration or slowdown period, so as to be equal to said natural vibration period of the moving part, under the condition that acceleration is constant in said acceleration or slowdown period.

7. A drive pattern computing method according to claim 6, wherein said natural vibration period of the moving part is calculated by driving the moving part in a predetermined pattern by an electric motor, detecting a variation of a driving current of the electric motor, which variation is caused due to the vibration of the moving part in response to said driving, and measuring said natural vibration period of said moving part from the detected electric current waveform.

8. A method of computing a drive pattern for suppressing vibration of a moving part of an industrial robot, comprising the steps of:
   (a) obtaining a drive pattern of the moving part;
   (b) calculating a time difference of torque peaks in acceleration and slowdown periods of the drive pattern; and
   (c) correcting said drive pattern in such a manner that said time difference changes substantially by an integral number times a natural vibration period of the moving part.

9. A method of computing a drive pattern for suppressing vibration of a moving part of an industrial robot, comprising:
   (a) obtaining a drive pattern of the moving part;
   (b) calculating a time difference of torque peaks in acceleration and slowdown periods of said drive pattern; and
   (c) determining, by comparing said time difference with a natural vibration period of the moving part, whether said time difference is longer or shorter than said natural vibration period;
   (d) said method, if said time difference is shorter than said natural vibration period, further including the steps of (1) correcting said drive pattern in such a manner that said time difference of said torque peaks substantially coincides with said natural vibration period;
   (e) said method, if said time difference is longer than said natural vibration period, further including the steps of: (2) calculating a time duration of each of acceleration and slowdown periods of said drive pattern; and (3) determining, by comparing the duration of each of said acceleration and slowdown periods of said drive pattern with said natural vibration period, whether the duration of said acceleration and slowdown periods is longer or shorter than said natural vibration period;
   (f) said method, if the duration of said acceleration or slowdown period is longer than said natural vibration period, further including the steps of: (4) calculating a differential value of acceleration with respect to time of the moving part from said drive pattern; (5) calculating a time difference of rise and fall portions of said acceleration time differential value; and (6) correcting said drive pattern, in such manner that said time difference changes by an integral number times said natural vibration period, by fixing the duration of said acceleration or slowdown period and setting an acceleration constant increase period in which acceleration increases with time at a constant rate and an acceleration constant decrease period in which acceleration decreases with time at a constant rate;
   (g) said method, if said acceleration or slowdown period is shorter than said natural vibration period, further including the step of (7) correcting said drive pattern, in such manner that the duration of said acceleration or slowdown period coincides with said natural vibration period, under the condition that acceleration is constant in said acceleration or slowdown period.

10. A method of controlling a moving part of an industrial robot, comprising the steps of: driving the moving part; and controlling the moving part in a predetermined drive pattern in which a time difference of rise and fall portions of a differential value of acceleration with respect to time of the moving part is substantially an integral number times a natural vibration period of said moving part.

11. A controlling method according to claim 10, wherein said drive pattern includes an acceleration period in which said moving part is to be accelerated and a slowdown period in which said moving part is to be slowed down, and said acceleration and slowdown periods include an acceleration constant increase period, in which acceleration increases with time at a constant rate, and an acceleration constant decrease period in which acceleration decreases with time at a constant rate.

12. A method of controlling a moving part of an industrial robot, comprising the steps of: driving the moving part; and controlling the moving part in a predetermined drive pattern in which a time difference of torque peaks in accelerating and slowing down the moving part is substantially an integral number times a natural vibration period of the moving part.

13. An apparatus for computing a drive pattern for suppressing vibration of a moving part of an industrial robot, comprising:
   (a) means for obtaining a drive pattern of said moving pattern which pattern includes an acceleration period, a constant speed period and a slowdown period;
   (b) means for calculating a differential value of acceleration with respect to time of said moving part from said drive pattern;
   (c) means for calculating a time difference of rise and fall portions of said acceleration time differential value; and
   (d) means for correcting said drive pattern in such a manner that said time difference is substantially an integral number times a natural vibration period of the moving part.

14. A drive pattern computing apparatus according to claim 13, wherein said drive pattern correcting means comprises means for fixing the duration of at least acceleration and slowdown period, means for setting in said fixed duration of the acceleration or slowdown period an acceleration constant increase period in which acceleration increases at a constant rate with respect to time, and an acceleration constant decrease period in which acceleration decreases at a constant rate with respect to time, and means for correcting the duration of each of said acceleration constant increase period and acceleration constant decrease period.

15. An apparatus for computing a drive pattern for suppressing vibration of a moving part of an industrial robot, comprising:
   (a) means for obtaining a driving pattern of the moving part of the industrial robot, which pattern includes an acceleration period, a constant speed period and a slowdown period; and
   (b) means for determining, by comparing the duration of each of said acceleration period and slowdown period of said drive pattern with a natural vibration period of the moving part, whether the duration of each of said acceleration period and slowdown period of the drive pattern is longer or shorter than said natural vibration period;
   (c) said apparatus, if said acceleration or slowdown period is longer than said natural vibration period, further including: (1) means for calculating a differential value of acceleration with respect to time of the moving part from said drive pattern; (2) means for calculating a time difference between a rise portion and a fall portion of said differential value of acceleration with respect to time; and (3) means for correcting said drive pattern, in such a manner that said time difference changes substantially by an integral number times the natural vibration period of the moving part, by fixing the duration of at least acceleration and slowdown period, setting in said fixed duration of the acceleration or slowdown period an acceleration constant increase period, in which acceleration increases at a constant rate with respect to time, and an acceleration constant decrease period, in which acceleration decreases at a constant rate with respect to time, and correcting the duration of each of said acceleration constant increase period and acceleration constant decrease period;
   (d) said apparatus, if said acceleration or slowdown period is shorter than said natural vibration period, further including (4) means for correcting the duration of said acceleration or slowdown period, so as to be equal to said natural vibration period of the moving part, under the condition that acceleration is constant in said acceleration or slowdown period.

16. An apparatus for computing a drive pattern for suppressing vibration of a moving part of an industrial robot, comprising:

(a) means for obtaining a drive pattern of the moving part;

(b) means for calculating a time difference of torque peaks in acceleration and slowdown periods of the drive pattern; and (c) means for correcting said drive pattern in such a manner that said time difference changes substantially by an integral number times a natural vibration period of the moving part.

17. An apparatus for computing a drive pattern for suppressing vibration of a moving part of an industrial robot, comprising:

(a) means for obtaining a drive pattern of the moving part;

(b) means for calculating a time difference of torque peaks in acceleration and slowdown periods of said drive pattern; and (c) means for determining, by comparing said time difference with a natural vibration period of the moving part, whether said time difference is longer or shorter than said natural vibration period;

(d) said apparatus, if said time difference is shorter than said natural vibration period, further including: (1) means for correcting said drive pattern in such a manner that said time difference of said torque peaks substantially coincides with said natural vibration period;

(e) said apparatus, if said time difference is longer than said natural vibration period, further including: (2) means for calculating a time duration of each of said acceleration and slowdown periods of said drive pattern; and (3) means for determining, by comparing the duration of each of said acceleration and slowdown periods of said drive pattern with said natural vibration period, whether the duration of said acceleration and slowdown periods is longer or shorter than said natural vibration period;

(f) said apparatus, if the duration of said acceleration or slowdown period is longer than said natural vibration period, further including: (4) means for calculating a differential value of acceleration with respect to time of the moving part from said drive pattern; (5) means for calculating a time difference of rise and fall portions of said acceleration time differential value; and (6) means for correcting said drive pattern, in such a manner that said time difference changes by an integral number times said natural vibration period, by fixing the duration of said acceleration or slowdown period and setting an acceleration constant increase period, in which acceleration increases with time at a constant rate, and an acceleration constant decrease period in which acceleration decreases with time at a constant rate;

(g) said apparatus, if said acceleration or slowdown period is shorter than said natural vibration period, further including (7) means for correcting said drive pattern, in such manner that the duration of said acceleration or slowdown period coincides with said natural vibration period, under the condition that acceleration is constant in said acceleration or slowdown period.

\* \* \* \* \*